United States Patent [19]
Klendworth et al.

[11] Patent Number: 6,093,673
[45] Date of Patent: Jul. 25, 2000

[54] POLYMERIZATION SYSTEM WITH ORGANOSILICON COMPOUND

[75] Inventors: Douglas D. Klendworth, West Chester; Gregory G. Hlatky, Morrow, both of Ohio

[73] Assignee: Equistar Chemicals, LP, Houston, Tex.

[21] Appl. No.: 09/406,858

[22] Filed: Sep. 27, 1999

[51] Int. Cl.[7] .......................... C01B 33/00; C01G 23/00; C01G 23/02
[52] U.S. Cl. .......................... 502/116; 502/103; 502/123
[58] Field of Search ...................................... 502/103, 116, 502/123

[56] References Cited

U.S. PATENT DOCUMENTS 4,473,660  9/1984  Albizzati et al. ........................ 502/124

FOREIGN PATENT DOCUMENTS 9-220476   8/1997  Japan .
10-338698  9/1998  Japan .

OTHER PUBLICATIONS

Acta Polytechnica Scandinavica Chemical Technology, Series No. 223, 1995, pp. 1–54.

Makromal Chemical 192, 1115–1127 (1991).

Makromal Chemical 193, 229–241 (1992).

*Primary Examiner*—Mark L. Bell
*Assistant Examiner*—Michael J. DiVerdi
*Attorney, Agent, or Firm*—William A. Heidrich

[57] ABSTRACT

The invention relates to olefin polymerization using an organosilicon compound from the pyrazolyl family as an external adjuvant.

10 Claims, No Drawings

POLYMERIZATION SYSTEM WITH ORGANOSILICON COMPOUND

BACKGROUND OF THE INVENTION

1. Field of the Invention

The invention pertains to olefin polymerization. Specifically, it relates to the use of a select organosilicon compound as part of a catalyst system for alpha olefin polymerization. In a particular practice, the invention leads to increased catalyst activity without sacrifice of stereoregularity in polymerization of alpha olefins of three carbons or more.

2. Description of the Prior Art

While numerous catalysts are known to effectuate polymerization of alpha olefins, those employed commercially are invariably constituted of one or more transition metals. These in turn are almost uniformly utilized in conjunction with various other compounds to enhance activity. For example, industrial polymerization of alpha olefins using transition metal catalysts typically employ an aluminum alkyl compound as a cocatalyst to improve yield.

Other externally added compounds are sometimes used to promote select polymer characteristics. For example, in propylene polymerization, not only is yield a consideration, so is stereoregularity. This is because unlike ethylene, polymerization of propylene results in a polymer whose backbone has methyl groups pendent thereto. Three possible spacial configurations can result: the methyl groups can all be on the same side of the backbone plane (isotactic polypropylene), or they can they can regularly alternate (syndiotactic polypropylene), or they can be randomly placed (atactic polypropylene).

These conformations have important economic implications because they affect the thermal and mechanical properties of the resultant polymer. Thus isotactic polypropylene is highly crystalline, dense, strong and hard; it is accordingly one of the more high volume and commercially significant thermoplastics. Atactic polypropylene, on the other hand, is low in crystallinity, and is typically sticky, soft and weak; it unsurprisingly has few commercial applications.

Because a stereoregular structure is preferred, much effort has been expended to foster this in the polymerization reaction. Conventional Ziegler-Natta catalysts benefit from a tendency to favor the production of the isotactic form in the first instance. Nonetheless, various techniques have been explored to further the stereoregular proclivity of such catalysts. One of the most common involves the use of an external electron donor.

External donors are generally thought to improve isotacticity by, among other things, selectively deactivating aspecific sites or altering same to isospecific sites. In the ordinary course, the external donors most often used are Lewis bases. External donors of initial industrial interest have included aromatic esters, such as ethyl benzoate, methyl toluate, and ethyl anisate; as well as various amines, such as tetramethylpiperdine. One of the more recent classes of compounds to capture commercial attention in this regard are the silanes. Typically, these are compounds of the formula $R_nSi(OR')_{4-n}$, where R and R' are hydrocarbyl and n is 1, 2 or 3.

Conventional wisdom dictates that to afford maximum activity and stereoregularity, silanes of the above type must have the bulkiest R groups practicable concurrent with the smallest possible alkoxy (OR') groups. Accumulated knowledge also prescribes that the R groups should be limited to those containing only hydrogen and carbon so as to avoid any untoward electronic affects. Thus use of R groups such as phenyl, cyclopentyl, cyclohexyl and isobutyl in tandem with methoxy groups (OR') are customary.

Despite the utility of these compounds, some are difficult to obtain commercially or synthetically whereas others have proven to be deleterious to catalyst performance or to the overall polymerization reaction. Hence there is an ongoing need to identify materials that will enhance activity, and do so without adversely affecting stereoregularity in situations where this is a concern.

SUMMARY OF THE INVENTION

The present invention is directed to an olefin polymerization catalyst system comprised of:

(A) a transition metal-containing catalyst component;
(B) an organometallic compound; and
(C) an organosilicon compound of the formula:

$$R_nSiR^1_{4-n}$$

wherein each R is independently hydrogen, alkyl, aryl or alkaryl, each $R^1$ is independently an unsubstituted or substituted pyrazolyl, triazolyl or tetraazolyl, and n is 1, 2, or 3.

DETAILED DESCRIPTION OF THE INVENTION

Component (A):

The transition metal-containing catalyst component (A) of the present invention are those well known in the art and include those comprised of conventional Ziegler-Natta catalysts and those comprised of metallocenes. Without limitation, transition metals in this regard belong to Group IVB to VIB. One or more transition metals may be present. Titanium is preferred. By way of example only, titanium compounds useful in forming Component (A) include those having the formula $Ti(OR^2)_aX_{4-a}$ wherein each $R^2$ is independently alkyl, aryl, alkaryl, aralkyl or alkylsilyl, X is halogen and a is 0 or 1, 2, 3 or 4. Titanium tetrahalides such as TiCl4 are preferred in this regard.

Component (A) may optionally include one or more Group II metals, with preference for Group IIA metals such as magnesium, which can be present in its metallic state or from a compound having the formula $$R^3_bMgX^1_{2-b}$$

wherein each $R^3$ is independently alkyl, aryl, aralkyl, alkaryl, alkoxy, aryloxy, $X^1$ is halogen and b is 0, 1, or 2. Magnesium halides, e.g. $MgCl_2$, are preferred.

Component (A) may also optionally include one or more internal electron donor compounds known in the art, e.g. alcohols, esters, ethers, ketones and the like. In a preferred practice, Component (A) also contains one or more halogens. Halogens in this regard could be provided by, e.g. a titanium halide or magnesium halide as hereinbefore described; or they can be provided by halogenating agents known in the art, e.g. $SiCl_4$ and the like.

Component (A) is typically solid, and can be unsupported, or supported on one of its constituent parts, e.g. $MgCl_2$ if present, or it can be supported on an inert inorganic carrier, e.g. silica, alumina; or on a polymer support.

Compound (B):

Organometallics that are serviceable for compound (B) are those that act as cocatalyst for the transition metal-containing catalyst component (A). Without limitation, the organometallics of compound (B) include those based on metals belonging to Group IA–IIIA. Group IIIA metal compounds are typically preferred and include, e.g. organoaluminums such as those having the formula $$R^4{}_c AlX^2{}_{3-c}$$

wherein each $R^4$ is independently alkyl, aryl, alkaryl, aralkyl, alkoxy or aryloxy, $X^2$ is halogen and c is 0 or 1, 2 or 3. Trialkyl aluminums are preferred, e.g triethylaluminum. Group IIIA organometallics also include alumoxanes, such as methyl alumoxane and the like. Mixtures of organometallics as hereinbefore described may also be used.

While the specific amount of organometallic compound (B) used in the practice of the present invention can vary widely, generally about 0.01 to about 100,000, preferably about 1 to about 10,000 moles per mole of transition metal in component (A) is employed.

Compound (C):

The organosilicon compound (C) of the present invention has the formula $$R_n SiR^1{}_{4-n}$$

wherein each R is independently hydrogen, alkyl, aryl or alkaryl, each $R^1$ is independently an unsubstituted or substituted pyrazolyl, triazolyl or tetraazolyl, and n is 1, 2, or 3.

In the practice of the invention, the organosilicon compound (C) is an externally added adjuvant to the polymerization reactor. It is to thus be distinguished from compounds, such as internal electron donors, which form part of the transition metal-containing catalyst component. As contemplated by the invention, compound (C) is added to the reactor separate from the catalyst, although it may be precontacted with organometallic compound (B). In the case of propylene polymerization, organosilicon compound (C) acts as an external electron donor.

When substituent R is alkyl, preferred groups are $C_1$–$C_{10}$, with $C_1$–$C_6$ more preferred and $C_1$–$C_3$ most preferred. Individually, such groups may each be in the normal, branched (e.g. neohexyl) or cyclic (e.g. cyclohexyl) configurations.

When substituent R is aryl, preferred groups are aromatic rings having up to 10 ring carbon atoms, preferably 6 to 10 ring carbon atoms. Such groups are more preferably monocyclic aromatics (e.g. phenyl) or polycyclic aromatics including without limitation orthofused polycyclic aromatics, such as α-naphthyl and β-naphthyl.

When subsitutent R is alkaryl, preferred groups include those having up to 16 carbon atoms total, with each alkyl preferably $C_1$–$C_6$, more preferably $C_1$–$C_3$, and each aryl group being as hereinbefore defined. An example of a preferred alkaryl is tolyl.

The pyrazolyl substituent of (C) has the structure

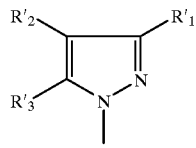

in which any of the three ring carbons is unsubstituted (i.e., has one hydrogen) or is substituted with $R'_1$, $R'_2$, and/or $R'_3$, each of which may be independently a hydrocarbyl (including without limitation alkyl, such at $C_1$–$C_{30}$, $C_1$–$C_{10}$ preferred), halide, alkoxide, dialkylamino, nitro, or similar group. Two adjacent hydrocarbyl groups may be joined to form a cyclic structure, as in indazole or tetrahydroindazole. The pyrazolyl groups are sigmabonded to the silicon through the 1-nitrogen. Unsubstituted and hydrocarbyl-substituted pyrazolyl groups are preferred.

Similarly, triazolyl ligands have the following structures:

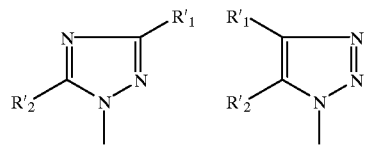

in which $R'_1$ and $R'_2$ are defined above.

A tetraazolyl ligand has the following structure:

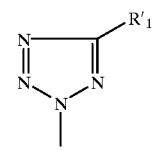

in which $R'_1$ is defined as above.

Particular organosilicons contemplated as compound (C) in the present invention including without limitation: suitable neutral, multidentate ligands include, for example, bis(pyrazolyl)dimethylsilane, bis(pyrazolyl) methylphenylsilane, bis(pyrazolyl)diphenylsilane, bis (pyrazolyl)silacyclobutane, bis(pyrazolyl)silacyclopentane, bis(3,5-dimethylpyrazolyl)dimethylsilane, bis(indazole) dimethylsilane, bis(4-chloropyrazolyl)dimethylsilane, bis(4-methylpyrazolyl)dimethylsilane, bis(3,5-trifluoromethylpyrazolyl)dimethylsilane, tris(pyrazolyl) methylsilane, bis(pyrazolyl)methylsilane, tris(3-methylpyrazolyl)methylsilane, tetrakis(pyrazolyl)silane, bis (triazolyl)dimethylsilane, bis(benzotriazolyl) dimethylsilane, tris(benzotriazolyl)methylsilane, bis (tetraazolyl)dimethylsilane, tris(tetraazolyl)methylsilane, tetra(3,5-dichloropyrazolyl)silane, and the like, and mixtures thereof. Particularly preferred are bis and tris (pyrazolyl)alkylsilanes and bis and tris(3,5-disubstituted pyrazolyl)alkylsilanes.

The organosilicons contemplated as compound (C) are easy to prepare. The azacycles (e.g., pyrazole, 3,5-dimethylpyrazole, benzotriazole, tetrazole, and the like) are often commercially available. In one convenient preparation, the azacycle is deprotonated by reacting it with a strong base such as n-butyllithium in an inert solvent (e.g., ether). Evaporation of solvent gives the alkali metal salt. Two to four equivalents of this salt are then reacted with a Group IVA compound, preferably one having an equivalent number of good leaving groups (e.g., three moles of azacycle salt and one mole of methyltrichlorosilane) to produce the neutral, multidentate ligand. The workup usually consists of dissolving the reaction products in a solvent (hydrocarbon or halogenated hydrocarbon, e.g.), filtering to remove alkali metal salts, and recrystallizing the ligand.

While the specific amount of organosilicon compound (C) used in the practice of the present invention can vary widely, generally a mole ratio of Si: transition metal, e.g. Ti, from component (A) of about 50:1 to about 1:1 is employed; preferably about 25:1 to about 5:1; more preferably about 15:1 to about 8:1. Mole ratios of metal (e.g. Al) from organometallic compound (B) are generally about 100:1 to about 1:1; preferably about 80:1 to about 5:1; more preferably about 20:1 to about 10:1.

Mixtures of organosilicon compounds having the above described formula may also be used.

EXAMPLES

ORGANOSILICON COMPOUND PREPARATION

Example 1
Preparation of Bis(pyrazolyl)dimethylsilane

Pyrazole (6.81 g) is dissolved in ether (125 mL), and n-butyllithium (40 mL of a 2.5 M solution in hexane) is added. After 0.5 h, the solvent is evaporated, and pentane is added. The white solids (7.30 g) are filtered off and dried.

The solids are dissolved in ether (100 mL), and dichlorodimethylsilane (6.36 g) in ether (10 mL) is added dropwise. The cloudy suspension is stirred overnight and filtered. The filtrate is evaporated, and the residue is dissolved in warm pentane and filtered. Cooling of the filtrate to −30° C. precipitates white solids (7.26 g). $^1$H NMR (toluene-d$_8$): 0.64 (s, CH$_3$—Si), 6.09(t), 7.28(d) 7.70(d).

Example 2
Preparation of Bis(3,5-dimethylpyrazolyl)dimethylsilane 3,5-Dimethylpyrazole (9.61 g) is dissolved in ether (175 mL), and n-butyllithium (10 mL of a 10 M solution in hexane) is added. After 1.5 h, the mixture is evaporated, and pentane is added. Cooling to −30° C. precipitates white solids (8.53 g), which are filtered off and dried.

The solids are dissolved in ether (100 mL), and dichlorodimethylsilane (5.40 g) in ether (10 mL) is added dropwise. A white solid precipitates. The mixture is refluxed for 1.5 h, and is then cooled to room temperature and filtered. The filtrate is evaporated, and the resulting white crystals are dissolved in pentane and filtered. Cooling of the filtrate to −30° C. precipitates white crystals (5.43 g). $^1$H NMR (toluene-d$_8$): 0.82 (s, CH$_3$—Si), 1.79(s), 2.20(s), 5.69(s).

Example 3
Preparation of Tris(pyrazolyl)methylsilane

Pyrazole (6.81 g) is dissolved in ether (125 mL), and n-butyllithium (40 mL of a 2.5 M solution in hexane) is added. After 0.5 h, the solvent is evaporated, and pentane is added. The white solids (7.20 g) are filtered off and dried.

The solids are dissolved in ether (150 mL), and trichloromethylsilane (4.85 g) in ether (15 mL) is added dropwise. The mixture is stirred overnight and filtered. The filtrate is evaporated, and the residue is dissolved in warm pentane and filtered. Cooling of the filtrate to −30° C. precipitates white crystals (5.13 g). $^1$H NMR (toluene-d$_8$): 1.04 (s, CH$_3$—Si), 5.89(t), 7.21(s), 7.52(s).

Example 4
Preparation of Tris(3,5-dimethylpyrazolyl)methylsilane 3,5-Dimethylpyrazole (19.2 g) is dissolved in ether (150 mL), and n-butyllithium (20 mL of a 10 M solution in hexane) is added. After 0.5 h, the solvent is evaporated, and the solids are collected with hexane and cooled to −30° C. Yield: (14.7 g).

The solids are dissolved in ether (125 mL), and trichloromethylsilane (7.17) is added dropwise. The mixture is refluxed for 1 h, cooled, and filtered. The filtrate is evaporated, and the residue is dissolved in pentane (200 mL) and filtered. Cooling of the filtrate to −30° C. precipitates white crystals (9.84 g). $^1$H NMR (toluene-d$_8$): 1.58 (s, 3-CH$_3$ and CH$_3$—Si), 2.19(s), 5.69(s).

The catalyst system of the present invention is useful in the polymerization of olefins, including but not limited to homopolymerization and copolymerization of alpha olefins having three or more carbon atoms. The present invention is particularly utile in propylene polymerization.

The following examples are offered to illustrate aspects of the present invention; they are not to be construed as limiting the scope of same.

POLYMERIZATION EXAMPLES

Polymerizations were conducted in accordance with the following procedure unless otherwise noted.

A bench scale 2-liter reactor was used in all cases. The reactor was first preheated to at least 100° C. with a nitrogen purge to remove residual moisture and oxygen. The reactor was thereafter cooled to from 50° to 60° C.

For each run: triethyl aluminum and the organosilicon compounds identified below were added to the reactor by flushing them into the reactor using 0.75 liters of liquid propylene. A commercially available catalyst was used. The catalyst was diluted to 25 wgt % with MgCl$_2$ to more accurately feed small amounts to the reactor. Typically, 25 milligrams of the 25 wgt % was slurried in 4–6 cc's of heptane and then flushed into the reactor using 0.25 liters of propylene. Hydrogen was then metered into the reactor by decreasing the hydrogen pressure across a 300 cc vessel by a fixed amount. For example, for 75 psig hydrogen, the hydrogen pressure on a 300 cc vessel was reduced by 75 psig by adding it to the polymerization reactor.

The reactor temperature was then raised to 70° C. and the polymerization allowed to proceed for 1 hour. After polymerization, the reactor was vented, allowing the remaining propylene to volatilize and the reactor to cool due to heat of vaporization, both of which resulted in a quenching of the polymerization activity.

The reactor was then opened. The contents were removed and vacuum dried at elevated temperature.

Example 1

This example demonstrates the increase in activity and maintenance of stereoregularity obtainable with the present invention.

In Example 1A, 0.76 ml of bispyrazolyldimethylsilane [(pyz)$_2$SiMe$_2$] and 1.0 ml of triethylaluminum [TEAL] were employed in the procedure described above. The Al:Si mole ratio was 20:1.

In Example 1B, bis(3,5-dimethylpyrazolyl)dimethylsilane [Me$_2$pyz)$_2$SiMe$_2$] was substituted for (pyz)$_2$SiMe$_2$. The Al:Si mole ratio was 20:1.

In Comparative Examples 1A to 1D, cyclohexylmethyldimethoxysilane [CHMDS], representing conventional practice, was substitituted for (pyz)2SiMe2.

In Comparative Example 1E, no silane was employed.

The polymer was evaluated for melt flow rate (MFR), bulk density and percent hexane insolubles (% HI). Catalyst activity (g/g-h) was also measured.

The results are shown below in Table 1.

TABLE 1

| Example | Silane | Activity (g/g-h) | MFR | Bulk Dens. | % HI | Silane (ml) | TEAL (ml) |
|---|---|---|---|---|---|---|---|
| Ex. 1A | pyz$_2$SiMe$_2$ | 24088 | 6.3 | 23.6 | 94.2 | 0.76 | 1.0 |
| Ex. 1B | (Me$_2$pyz)$_2$SiMe$_2$ | 27206 | 3.8 | 24.6 | 98 | 0.76 | 1.0 |
| Comp. Ex. 1A | CHMDS | 23636 | 3.9 | 25.6 | 98.8 | 0.76 | 1.0 |
| Comp. Ex. 1B | CHMDS | 23308 | 3.4 | 25.5 | 99.2 | 0.76 | 1.0 |
| Comp. Ex. 1C | CHMDS | 23369 | 3.4 | 25.5 | 98.5 | 0.76 | 1.0 |
| Comp. Ex. 1D | CHMDS | 22923 | 5.6 | 25.4 | — | 0.76 | 1.0 |
| Comp. Ex. 1E | no silane | 20611 | 22 | 17.1 | 75.9 | 0 | 1.0 |

As seen from the data above, increased activity using (pyz)$_2$SiMe$_2$ and (Me$_2$pyz)SiMe$_2$ was obtained over that with a conventional silane, and with no silane. In addition to improved activity, excellent stereoregularity, as measured by the percent of hexane insolubles (% HI), is also apparent in the practice of the present invention.

Examples 2 and 3

These examples illustrate the affect of varying the TEAL to silane ratio.

In Examples 2A and 2B, 0.4 ml of (pyz)$_2$SiMe$_2$ and 0.5 ml TEAL were used. The Al:Si mole ratio was 20:1.

In Examples 2C and 2D, the amount of (pyz)$_2$SiMe$_2$ was held constant at 0.4 ml and 2.0 ml of TEAL was used. The Al:Si mole ratio was 80:1.

In Example 3A, 1.52 ml of (pyz)$_2$SiMe$_2$ and 0.5 ml of TEAL were used. The Al:Si mole ratio was 5:1.

In Examples 3B, 3C and 3D, the amount of (pyz)$_2$SiMe$_2$ was held constant at 1.52 ml and 2.0 ml of TEAL was used. The Al:Si mole ratio was 20:1.

The results are shown in Table 2 below.

TABLE 2

| Example | Silane | Activity | MFR | Bulk Dens. | % HI | Silane (ml) | TEAL (ml) |
|---|---|---|---|---|---|---|---|
| Ex. 2A | pyz$_2$SiMe$_2$ | 11513 | 0.5 | 15.6 | 87.4 | 0.4 | 0.5 |
| Ex. 2B | (Me$_2$pyz)$_2$SiMe$_2$ | 7344 | 0.1 | 19.9 | 95.3 | 0.4 | 0.5 |
| Ex. 2C | (Me$_2$pyz)$_2$SiMe$_2$ | 24640 | 54+ | 18.6 | 79.3 | 0.4 | 2.0 |
| Ex. 2D | pyz$_2$SiMe$_2$ | 20397 | 19.0+ | 19.6 | 85.1 | 0.4 | 2.0 |
| Ex. 3A | (Me$_2$pyz)$_2$SiMe$_2$ | 1385 | nm | nm | nm | 1.52 | 0.5 |
| Ex. 3B | pyz$_2$SiMe$_2$ | 29027 | 8.6 | 24.6 | 93.7 | 1.52 | 2.0 |
| Ex. 3C | pyz$_2$SiMe$_2$ | 21405 | 1.9 | 22.7 | 94 | 1.52 | 2.0 |
| Ex. 3D | (Me$_2$pyz)$_2$SiMe$_2$ | 21606 | 50+ | 19.5 | 71.9 | 1.52 | 2.0 |

*nm = not measured

What is claimed is:

1. An olefin polymerization catalyst system comprising:

(A) a transition metal containing catalyst component;

(B) an organometallic compound; and (C) an organosilicon compound of the formula:

$$R_nSiR^1_{4-n}$$

wherein each R is independently hydrogen, alkyl, aryl or alkaryl, each $R^1$ is independently an unsubstituted or substituted pyrazolyl, triazolyl or tetraazolyl, and n is 1, 2 or 3.

2. The catalyst system of claim 1 wherein each R is independently a $C_1$–$C_3$ alkyl and n is 1 or 2.

3. The catalyst system of claim 2 wherein each $R^1$ is independently an unsubstituted or substituted pyrazolyl.

4. The catalyst system of claim 3 wherein each R is methyl, each $R^1$ is unsubstituted pyrazolyl and n is 2.

5. The catalyst system of claim 2 wherein said substituted pyrazolyl is substituted with one or more $C_1$–$C_{10}$ alkyl groups.

6. The catalyst system of claim 5 wherein each R is methyl, each $R^1$ is 3,5-dimethylpyrazolyl and n is 2.

7. The catalyst system of claim 6 wherein said transition metal containing catalyst component (A) contains one or more Group IVB–VB transition metals and optionally one or more Group II metals; and said organometallic compound (B) contains one or more Group IIIA metals.

8. The catalyst system of claim 7 wherein said transition metal containing catalyst component (A) contains titanium and optionally, magnesium; and said organometallic compound (B) is an organoaluminum.

9. The catalyst system of claim 8 wherein said transition meal containing catalyst component (A) is formed from a titanium compound having the formula $Ti(OR^2)_aX_{4-a}$ wherein each $R^2$ is independently alkyl, aryl, alkaryl, aralkyl or alkylsilyl, X is halogen and a is 0 or 1, 2, 3 or 4; and optionally from a magnesium compound having the formula $$R^3{}_bMgX^1{}_{2-b}$$

wherein each $R^3$ is independently alkyl, aryl, aralkyl, alkaryl, alkoxy, aryloxy, $X^1$ is halogen and b is 0, 1 or 2; and said ogranoaluminum has the formula $$R^4_c AlX^2_{3-c}$$

wherein each $R^4$ is independently alkyl, aryl, alkaryl, aralkyl, alkoxy or aryloxy, X is halogen and c is 0 or 1, 2 or 3.

10. The catalyst system of claim 9 wherein said titanium compound is $TiCl_4$; said magnesium compound is present and is $MgCl_2$; and said organoaluminum is triethyl aluminum.

* * * * *